US006851388B2

(12) United States Patent
Vaccari et al.

(10) Patent No.: US 6,851,388 B2
(45) Date of Patent: Feb. 8, 2005

(54) CAGE WITH INTERCOMMUNICATING MODULAR COMPARTMENTS

(75) Inventors: Carlo Vaccari, Castelgomberto (IT); Alfred Pellegrini, Montebelluna (IT)

(73) Assignee: Ferplast S.p.A., Castelgomberto (IT)

(*) Notice: Subject to any disclaimer, the term of this patent is extended or adjusted under 35 U.S.C. 154(b) by 0 days.

(21) Appl. No.: 10/485,249

(22) PCT Filed: Jul. 29, 2002

(86) PCT No.: PCT/IT02/00498

§ 371 (c)(1),
(2), (4) Date: Jan. 29, 2004

(87) PCT Pub. No.: WO03/013231

PCT Pub. Date: Feb. 20, 2003

(65) Prior Publication Data

US 2004/0194720 A1 Oct. 7, 2004

(30) Foreign Application Priority Data

Aug. 6, 2001 (IT) .................................... VR2001A0084

(51) Int. Cl.[7] .............................................. A01K 1/03
(52) U.S. Cl. ........................ 119/452; 119/455; 119/472
(58) Field of Search ................................ 119/452, 453, 119/462, 463, 467, 470, 472, 473, 478, 482, 484, 416, 421, 455

(56) References Cited

U.S. PATENT DOCUMENTS

| 4,036,177 A | | 7/1977 | DeSmit ........................ 119/18 |
| 4,287,854 A | * | 9/1981 | Hansen et al. .............. 119/455 |
| 4,291,645 A | * | 9/1981 | Cruchelow et al. ......... 119/484 |
| 5,165,366 A | * | 11/1992 | Harvey ........................ 119/165 |
| 5,247,901 A | | 9/1993 | Landon et al. ................ 119/15 |
| 5,361,725 A | * | 11/1994 | Baillie et al. ................ 119/165 |
| 5,862,778 A | * | 1/1999 | Matsumoto ................. 119/472 |
| 5,950,566 A | | 9/1999 | Ricketts ....................... 119/473 |
| 2004/0025801 A1 | * | 2/2004 | Cheshire ...................... 119/472 |

FOREIGN PATENT DOCUMENTS

EP          0 744 122 A1     11/1996

OTHER PUBLICATIONS

International Search Report by EPO dated Dec. 18, 2003.

* cited by examiner

*Primary Examiner*—Yvonne R. Abbott
(74) *Attorney, Agent, or Firm*—Charles Berman, Esq.; Greenberg Traurig, LLP

(57) ABSTRACT

Cage (10) with intercommunicating modular compartments, for example for small domestic rodents, comprising a first compartment (11) provided with an aperture (12) which can be closed by a cover (13), wherein the first compartment comprises at least a further opening or passage (15) suited to allow the communication of the first compartment with at least a further compartment (14) joined to the first compartment (11).

11 Claims, 3 Drawing Sheets

CAGE WITH INTERCOMMUNICATING MODULAR COMPARTMENTS

TECHNICAL FIELD

The present invention refers to a cage with intercommunicating modular compartments, in particular but not exclusively for small domestic rodents such as hamsters, squirrels and mice.

More particularly, the present invention refers to a cage with intercommunicating modular compartments and transparent walls, suited to host small animals such as rodents and provided of optional components to render it more comfortable as possible for the animals hosted therein.

BACKGROUND ART

It is known that small domestic rodents are usually hosted inside cages provided with at least one transparent wall which allows the observation of their particularly amazing movements, when the cage is provided with optional components such as slides, small staircases, wheels or whatever else could the animal need to perform physical activity.

The cage also comprises dispensers for food and water, as well as resting areas where to leave the small rodent during the whole day with the exception of the few moments required for the regular cleaning and maintenance.

At present, cages for small domestic rodents are made in a single block and with variable dimensions in relation to the number and the size of the animals to be hosted.

Cages are usually provided of large apertures to allow an easy extraction or insertion of the animals as well as their efficient cleaning.

Usually such apertures are closed by means of covers provided with openings or slits for the aeration of the inner part of the cage.

A drawback is constituted by the fact that small cages are not modular and need to be changed with larger ones when it is desired to increase the number of the animals.

Another drawback is constituted by the fact that cages of large dimensions are not always really appropriate to the domestic room in which they should be included and further, they can hardly be moved or displaced due to their large encumbrance.

A further drawback of the cages with higher capacity relates to the fact that they are difficult to clean, being divided in several portions or compartments with fixed walls which are in same cases quite difficult to be reached from the outside.

Document EP-A-0744122 discloses an animal rearing cage and a framework to which a plurality of side plates for together forming the periphery of the animal rearing cage are detachably attached.

Document U.S. Pat. No. 5,950,566 discloses a cage including two or more movable walls that can restrain an animal in two or more dimensions. the cage includes telescopic or movable planar surfaces, one preventing an animal's lateral movement, and another preventing vertical movement.

Document U.S. Pat. No. 5,247,901 discloses a containment system for animal microbiological isolation containment including a plurality of two room suites combined into two suite containment units, selectively separable adjoining exercise runs for individual and group isolation, the suites being constructed of transparent, glass panels and and satinless steel.

Document U.S. Pat. No. 4,036,177 discloses an animal confining and housing device having a wheel supported carriage with a plurality of two sets of vertically spaced and parallel guide members thereon.

DESCRIPTION OF THE INVENTION

The present invention aims to provide a cage with intercommunicating modular compartments, in particular for small domestic rodents, that sets aside or significantly reduces the previously remarked drawbacks.

Furthermore, the present invention aims to provide a cage with modular compartments that can be assembled as preferred, according to the overall desired dimensions and so obtained by means of subsequently joined elements without the need to eliminate the previously purchased parts.

Another aim of the present invention is to provide a cage with modular compartments featuring several alternative pathways for the small rodents hosted therein.

This is achieved by a cage with modular intercommunicating compartments, in particular for small domestic rodents, having the features disclosed in the main claim.

The dependent claims outline particularly advantageous forms of embodiment of the invention.

The cage with modular intercommunicating compartments for small domestic rodents, according to the invention, comprises at least one compartment having an aperture that can be closed by a cover, and a further opening which corresponds, when two compartments are joined to each other, to the opening of at least a further compartment having as well at least a further aperture leading to another respective compartment.

According to the invention each compartment is externally provided with means for temporary fastening said compartment to adjacent compartment/compartments.

According to an advantageous form of embodiment, the cover of the first compartment is placed on the upper portion thereof and comprises a grid that can be joined to a longitudinal end of said compartment.

Each compartment comprises aeration holes to allow an adequate air circulation inside the cage.

All the walls of the cage, or most of them, are transparent to allow the movements of the small rodents hosted inside to be readily watched to.

According to an advantageous form of embodiment of the invention, each compartment comprises at least a wall that is completely removable to ensure an easy cleaning of its inside.

The temporary fastening means between the compartments can be realized with guides realised on particular edges of a compartment, suitable for receiving some corresponding retaining strips that are present on conjugated edges of adjacent compartments.

The modular cage according to the present invention shows a great advantage in respect of the known solutions, particularly in what concerns the vertical superimposition of the different modules.

Indeed, it is possible to superimpose to each other several modules and, in this way, to obtain a cage of large dimensions but with a relatively small base.

This is particularly important in certain situations, such as for example in rooms for children, where the child can stay in front of the cage that acts as a maxi-screen to watch the movements of the small animals, usually rodents, hosted inside.

ILLUSTRATION OF DRAWINGS

Other features and advantages of the invention will become evident on reading the following description of one embodiment of the invention, given as a non-binding and non-limiting example, with the help of the enclosed drawings, in which.

DESCRIPTION OF ONE FORM OF EMBODIMENT

Figure 1:
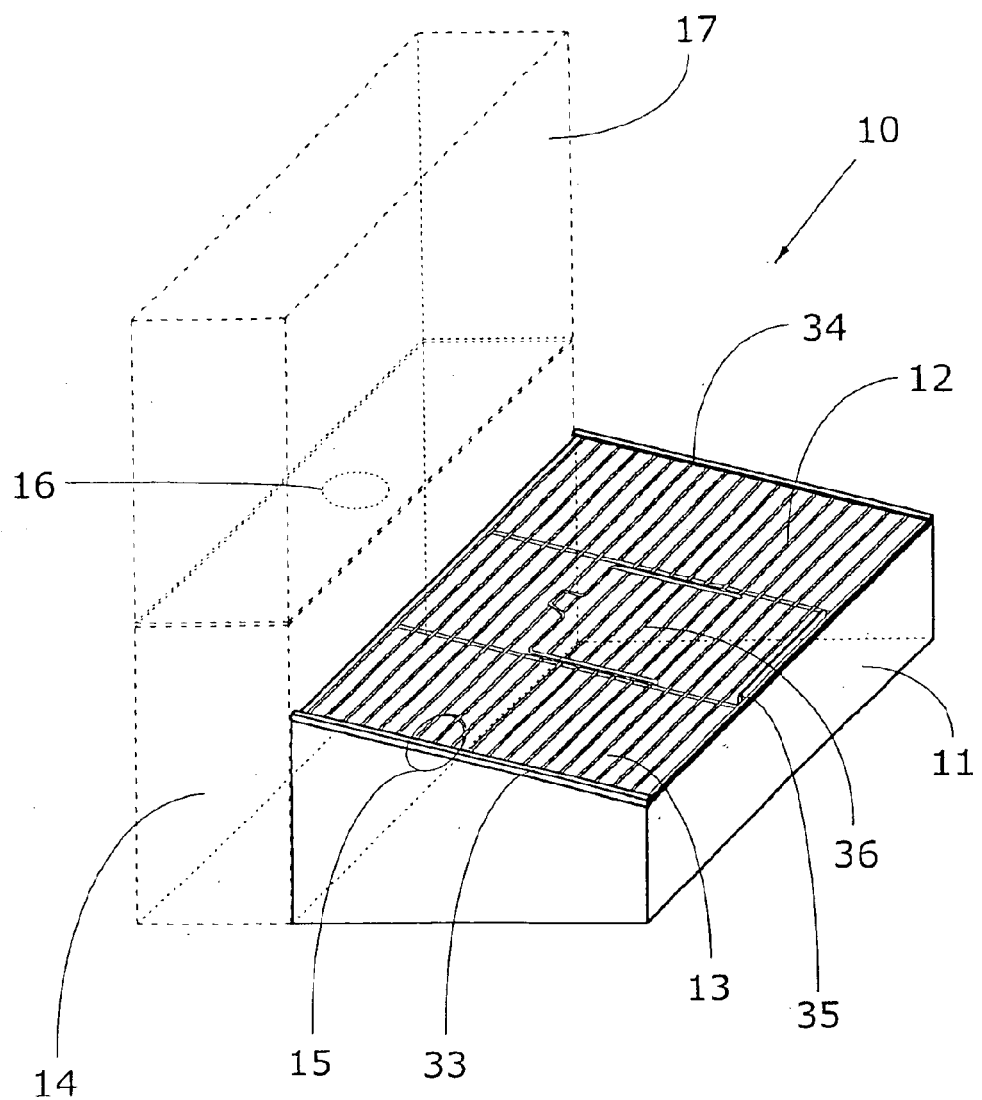
FIG. 1 shows a schematic perspective view of a cage according to the invention, where the front compartment has been highlighted.

In the figures, reference number 10 generally indicates a cage for small domestic rodents, in particular a cage with intercommunicating modular compartments.

According to this form of embodiment, cage 10 comprises a front compartment 11 having an external prismatic configuration and provided of an aperture involving its whole upper portion.

The aperture 12 is closed by a cover, which can be constituted by a grid 13 placed on the side borders of the aperture 12 and fixed thereto through any suitable temporary fastening means.

According to the form of embodiment shown in FIG. 1, grid 13 is joined to the front compartment 11 by means of a couple of guides 33, 34 which the side borders of the grid are inserted in, and by a protuberance 35 suited to block the front portion of the same grid.

The grid 13 can be provided of a cover 36 hinged to the wires consituting the grid itself.

A second compartment 14 can be coupled to a side wall of the front compartment 11; the compartments 11, 14 are in mutual communication by means of an opening 15 provided on both the compartments 11, 14.

The second compartment 14 has at least a further opening 16 leading to a third compartment 17 superimposed to the same compartment 14, and which comprises a corresponding opening.

The walls of the third compartment 17 are provided of further openings or passages, thereby allowing a communication with other possible compartments in order to obtain a modular cage 10.

Each compartment 14 or 17 comprises several holes (not shown in the figures) for the aeration of the inner part of said compartment.

Figure 3:
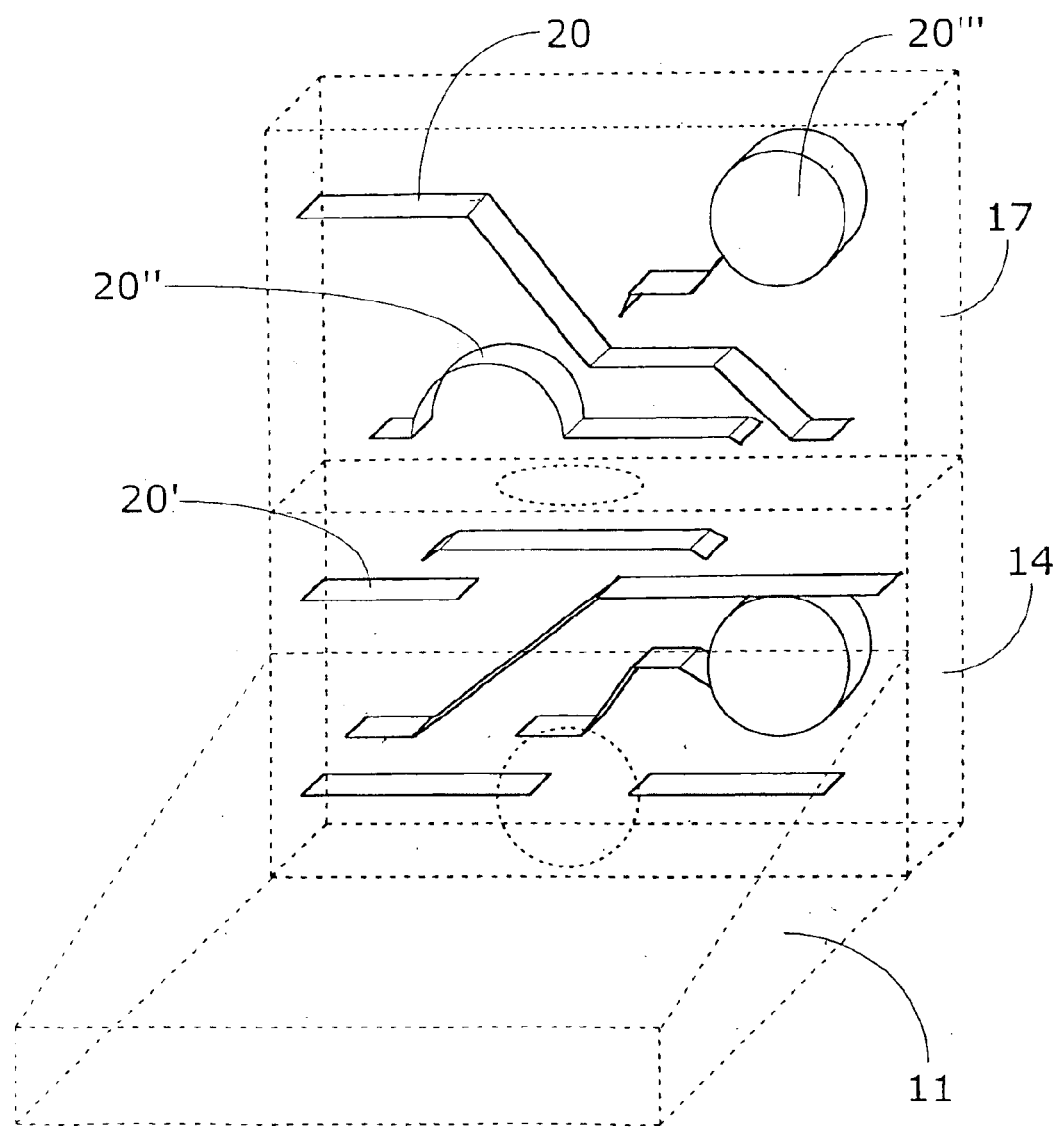
FIG. 3 shows a schematic perspective view of a cage according to the invention, where some alternative pathways inside the superimposed back compartments have been highlighted.

Referring to FIG. 3, it can be noted that each compartment 14, 17 comprises some shaped shelves 20, 20' . . . which define a pathway for the pets inside the same compartment 14 or 17, as well as lodgings for said animals.

The shaped shelves 20, 20' . . . allow the pets to move inside the compartments 14, 17, thereby reaching the connecting openings leading to the other compartments and running through the whole modular cage 10.

Besides the shaped shelves 20, 20' . . . the inner part of each compartment can comprise some optional components suited to the feeding of the small rodents, for example a drinking trough, a small fodder-trough, a mobile cylinder suitable to be moved by the animals for the maintenance of their physical shape.

According to the invention, each compartment 11, 14, 17, can be temporarily fastened to an adjacent compartment by means of a device with guides and strips.

For example, compartment 11 can have a reinforced edge comprising a side channel and a lower channel, each one running along the entire longitudinal extent of the same compartment 11 and suitable for receiving a conjugated strip of an adjacent compartment 14.

The side section of the channels as well as that one of the strips can be T-shaped in order to assure a good reciprocal connection of the compartments 11, 14, 17.

Figure 2:
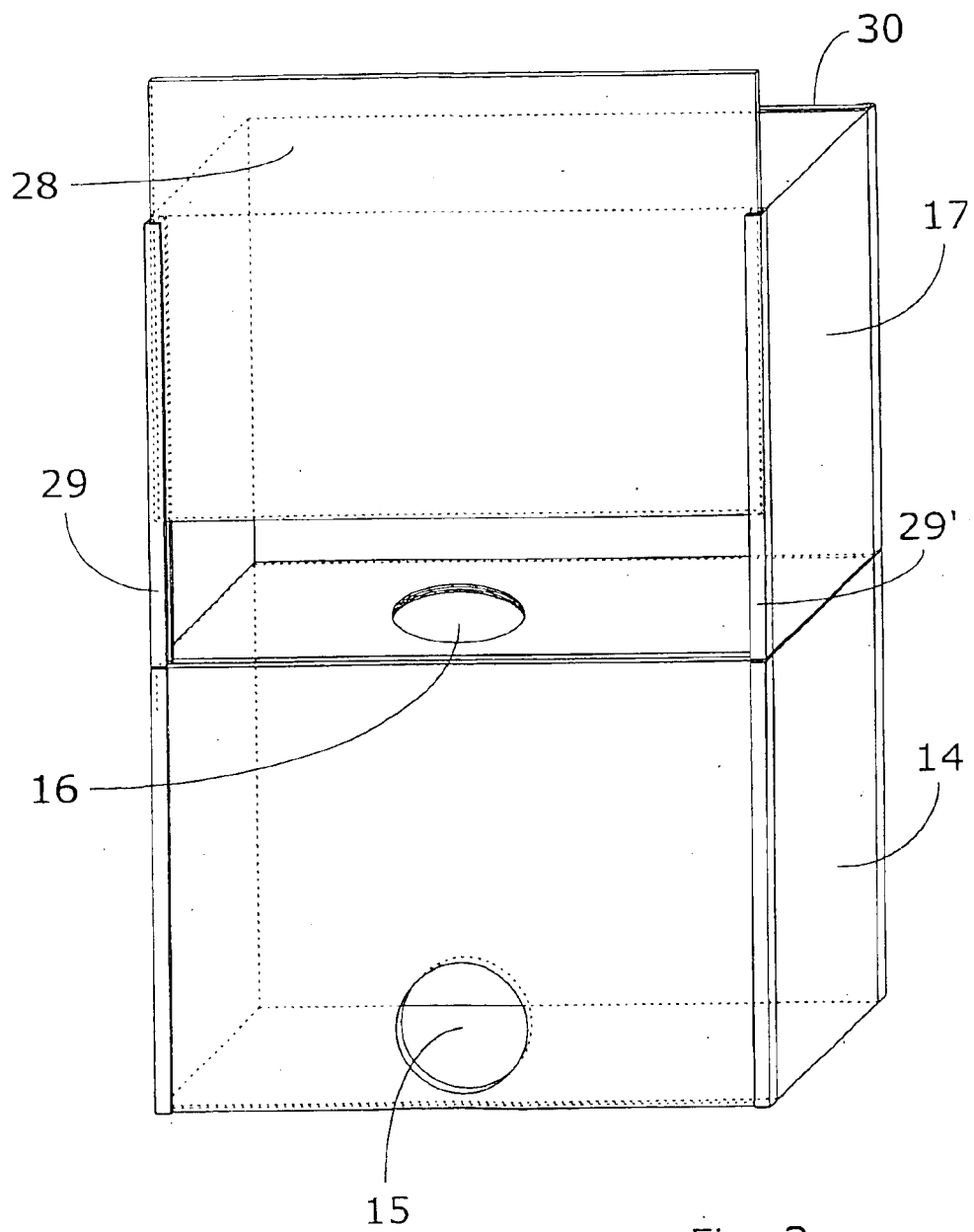
FIG. 2 shows a schematic perspective view of two superimposed back compartments of the cage according to the invention.

Turning now to FIG. 2, it is possible to see that at least a wall 28 of a compartment 14, 17 can be temporarily removed to allow the cleaning operations inside the same compartment 14, 17 to be carried out. In order to allow such removal, the frame of each compartment 14, 17 comprises guides 29, 29' suited to slidably receive the corresponding longitudinal edges of the wall 28.

Furthermore, such configuration can also be provided for the back walls 30, which may further comprise a series of aeration holes or micro-holes; moreover, according to a particularly advantageous form of embodiment, said back walls can be provided of a particular graphic arrangement, for example a drawing or a picture, to provide the cage with a particularly appealing background.

A sequence of holes or guides for fastening of any possible optional components of different nature can further be provided on any wall of the cage.

According to a further form of embodiment of the invention, the cage can be provided with a panel having the same dimensions as the wall 30, which can be advantageously personalized, from a graphic viewpoint, by the final user.

The cage 10 with intercommunicating modular compartments can have all its visible surfaces made of a transparent shock-resistant material, such as a composite plastic material.

Each opening 15, 16 can be contoured by a respective gasket (not shown in the drawings) suited to avoid the permeating of impurities or dirtiness that could stick between a compartment 11, 14, 17 and an adjacent one.

The invention has previously been described with reference to a particularly advantageously form of embodiment thereof.

However it is clear that the present invention includes several variants falling within the scope of the present invention.

For instance, the particular shape of the several compartments represented in the drawings is clearly not a limitation of the invention.

Furthermore, the fastening means employed to connect the several compartments to each other can be of different nature and easily designed by a skilled man in the art, having the simple function of keeping the compartments connected together in a possibly releasable fashion.

What is claimed is:

1. A cage for small pets comprising a first front compartment (11) with a box-like prismatic shape, having a bottom portion, a front wall and two side walls made of molded plastics, whereby the upper portion of said first compartment is open and includes a pair of side channels (33, 34) acting as guides for the insertion of a cover (13) for closing said upper portion and which has a door (36) through which the animals can be inserted into the cage and withdrawn therefrom, whereby the rear wall of said first compartment is mounted on guides, running along the vertical rear edges of said side walls, and it can be completely removed from the first compartment so as to provide an easy access to the inner part of said front compartment, wherein:

the rear wall of said first compartment includes an aperture (15);

the cage comprises a second compartment (14) that is constituted by a plastic box having the same width as the rear wall of the first compartment (11), and which comprises a bottom portion and four uprights positioned at the four corners of the box, whereby said uprights are constituted by respective guides housing the edges of side walls of said plastic box; and one of these side walls has an aperture (15) which, when the second compartment (14) is placed against the rear wall of said first compartment (11), is aligned to the aperture (15) that is provided in said rear wall.

2. Cage according to claim 1, wherein the cover of said second compartment (14) includes an aperture (16).

3. Cage according to claim 2, wherein it comprises a third compartment (17) that is constituted by a plastic box having the same width as the width of said second compartment (14), and which comprises a bottom portion and four uprights positioned at the four corners of the box, whereby said uprights are constituted by respective guides housing the edges of side walls of said plastic box, whereby the bottom portion of said third compartment (17) has an aperture (16) that, when the third compartment (17) is superimposed to said second compartment (14), is aligned to the aperture included in the cover of said second compartement (14).

4. Cage (10) according to claim 1, wherein each compartment is provided of means for temporary fastening said compartment to other compartment/compartments.

5. Cage (10) according to claim 1, wherein said cover of said first compartment (11) is a grid (13).

6. Cage (10) according to claim 1, wherein at least a compartment comprises aeration holes to allow an adequate air circulation inside said cage (10).

7. Cage (10) according to claim 1, wherein it has transparent walls.

8. Cage (10) according to claim 1, wherein each aperture (15, 16) is contoured by a respective gasket.

9. Cage (10) according to claim 1, wherein each compartment (11, 14, 17) internally comprises mobile or fixed optional components.

10. Cage according to claim 1, wherein at least one of the removable walls is provided with a background image.

11. Cage according to claim 1, wherein the walls of the different compartments are provided of holes or guides for fastening of accessories of different nature.

* * * * *